United States Patent [19]

Valyi

[11] 4,382,905

[45] May 10, 1983

[54] INJECTION MOLD DWELL CYCLE

[76] Inventor: Emery I. Valyi, 5200 Sycamore Ave., Riverdale, N.Y. 10471

[21] Appl. No.: 288,950

[22] Filed: Jul. 31, 1981

[51] Int. Cl.³ .......................................... B29C 17/07
[52] U.S. Cl. ................................. 264/520; 264/537; 425/526
[58] Field of Search ............... 264/513, 520, 521, 523, 264/537, 538; 425/523, 526, 533

[56] References Cited

U.S. PATENT DOCUMENTS

| 4,116,606 | 9/1978 | Valyi | 425/526 |
| 4,261,949 | 4/1981 | Spurr et al. | 264/538 X |
| 4,313,905 | 2/1982 | Haffle | 264/538 X |

FOREIGN PATENT DOCUMENTS 2339019  2/1975  Fed. Rep. of Germany ...... 425/526

*Primary Examiner*—Jan H. Silbaugh
*Attorney, Agent, or Firm*—Bachman and LaPointe

[57] ABSTRACT

Method for the preparation of oriented hollow articles of moldable organic plastic material which is characterized by a rapid operating cycle and a final article free from objectionable opacity. The disclosure teaches an injection molding station for controlled removal of parisons after altering the heat content thereof under conditions avoiding crystallization and thereby freeing the injection station for the formation of a second parison.

7 Claims, 1 Drawing Figure

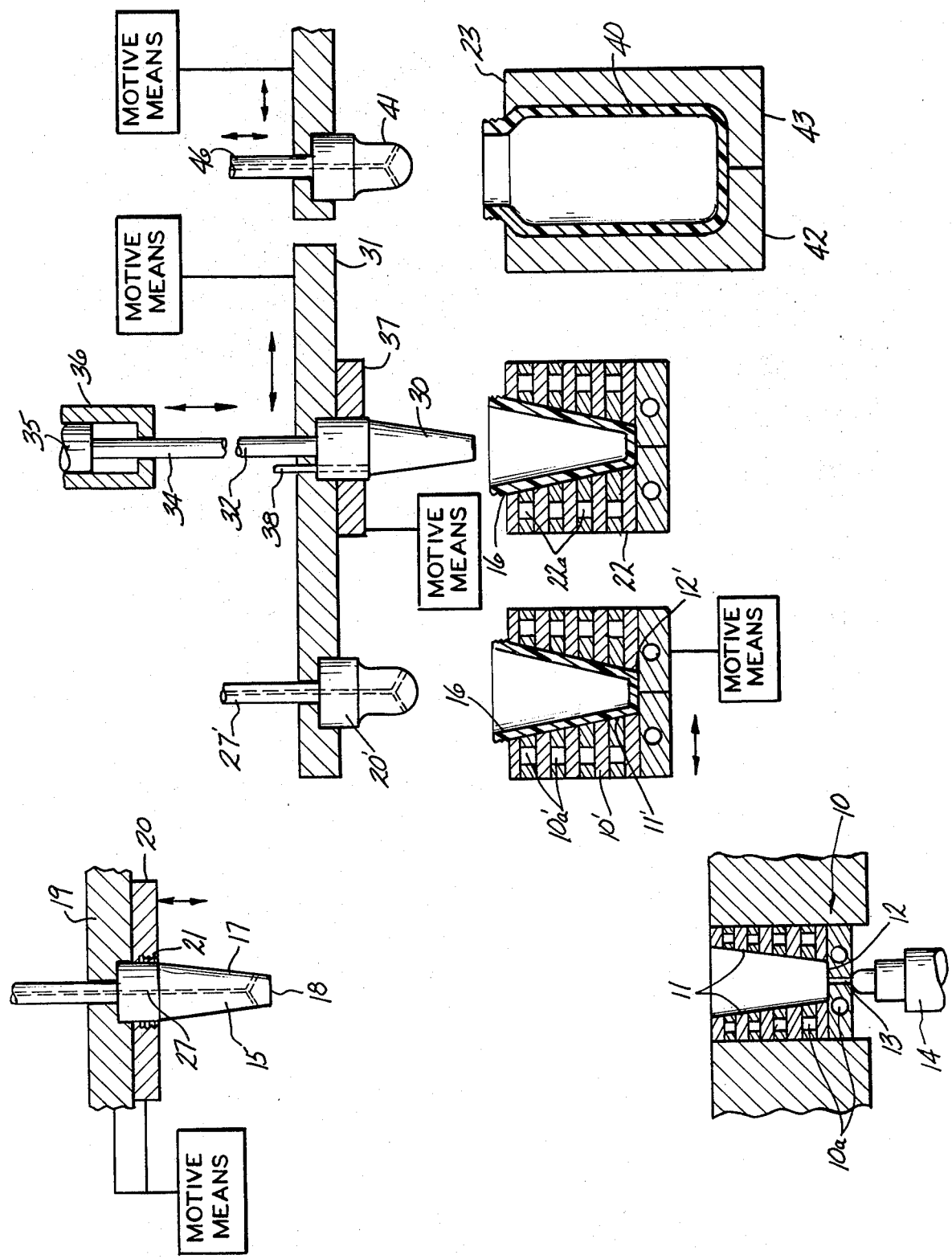

INJECTION MOLD DWELL CYCLE

BACKGROUND OF THE INVENTION

This invention relates to the art of forming an oriented hollow article of a moldable organic plastic material wherein the plastic material is susceptible to improvement in properties by orientation. A principal object of the present invention is to obtain a rapid operating cycle despite the fact that the particular plastic may require prolonged residence in an injection station which would result in a prolonged operating cycle. It is also an objective of the present invention to obtain freedom from opacity in the final article caused by crystalline regions.

The art teaches various methods for obtaining blow molded articles of organic plastic material from a pressure molded parison, such as in U.S. Pat. No. 3,349,155 and Re. 27,104. Generally these methods are characterized by forming a parison in a parison mold on a core, placing said formed parison into a blow mold and expanding said parison in the blow mold by means of fluid pressure.

While the blow molding operation tends to impart orientation to the article, the degree and type of such orientation is difficult to control and therefore it is difficult to obtain the advantageous properties in the article that multi-axial orientation is capable of providing. These advantageous properties are provided when orientation is carried out under the most desirable conditions of temperature distribution by stretching and circumferentially expanding said parison.

It is known that the control of orientation depends largely upon the control of the temperature of the parison just prior to orientation. It is found that such temperature control is best obtained by enclosing the parison prior to the orienting step in an environment, such as a mold whose surfaces may provide conductive or radiant heat exchange with the corresponding surfaces of the parison.

Plastic articles exhibiting the properties of multi-axial orientation, e.g., bottles and other hollow containers, are frequently made in two stages. The first of these two stages is the production of the parison usually by injection molding, or by other pressure molding procedures such as comparison molding and extrusion. The first stage thus serves to convert the chosen plastic into a parison of predetermined shape, having a wall thickness distribution suitable for the production of the final article shape and usually also having a neck or rim configuration suitable to receive a closure appropriate for the said article. If injection molded, the parison is normally removed from the injection mold typically consisting of a mold cavity, a core and a neck (or rim) mold, by extracting it from the mold cavity, by extracting the core therefrom and, either before or after its transformation into the finished article, by releasing it from the neck mold. All of these steps and procedures are well known in the injection molding art. The parison so produced is relatively cold, having a temperature substantially below that required for successful orientation, the reason being that the said parison could otherwise not be extracted from the mold cavity nor separated from the core without significant damage to its dimensions. If the outer surface of the parison is at an elevated temperature, it tends to adhere to the mold cavity and deform in the course of extraction. If the inner surface is not cold enough, it will adhere to the core. Moreover, when extracting the core, vacuum is created in the space within the parison from which the core is extracted and therefore the parison must be strong enough not to deform under the influence of the ambient atmospheric pressure acting upon the outside thereof. In order for the parison to attain the requisite strength, it must be cooled well below that temperature at which it is desirable to form it into the finished article.

The parison so made is next subjected to a second stage of operations wherein it is heated to that temperature at which its transformation into the finished article is to take place and, once at that temperature, it is expanded under conditions imparting the desired orientation.

Such two-stage operations are well known in the art. For example, in a machine designated as RHB 5 built by the Cincinnati-Milacron Company, conventional parisons that have been previously injection molded in a conventional manner are passed through parallel banks of infrared heaters, usually while being rotated around their axes to insure improved heating and, upon reaching the desired temperature, placed into a blow mold in which a stretch mandrel extends the length of the parison to a predetermined degree, followed by expanding the extended parison into conformance with the blow mold by means of a pressure fluid. Other similarly acting devices are well known and described, e.g., in the February and March, 1976 issues of *Modern Plastics* (a McGraw-Hill Publication). One such device is known as the Model 650 Machine built by Nissei Plastics Industrial Co., Ltd. of Japan, a schematic description of which is given in U.S. Pat. No. 3,944,643 and U.S. Pat. No. 4,105,391. In that machine, the parison is injection molded and cooled in the injection mold which includes a core, to a temperature at which it is easily removed from said core (according to claim 1 of the above U.S. Pat. No. 3,944,643). The parison is then transferred by means of a neck mold to a heating environment designated as a reheating mold (claim 1) or heating device (Column 1, line 6), in which its temperature is raised to that desired for orientation, by means of external and, if found necessary, also internal heaters which may be the radiant or contacting type. Once the parison reaches the desired temperature, it is transferred to a blow mold in which it is converted into the finished article by stretching and blowing, as above described in connection with the RHB 5 Machine.

The disadvantages of such two-stage operations include a slow cycle due to the fact that the parison must first be cooled from the temperature at which it is molded to near room temperature, only to be heated once more to the relatively high orientation temperature, with a corresponding waste of heat. In addition, heating of the parison is unsatisfactory because, it being made of an organic polymer and hence a poor heat conductor, uniform heating across its wall thickness is very difficult and time consuming to obtain.

In addition to the above two-stage procedures, a single stage operation may be employed, wherein the parison is cooled after having been molded only enough to lower its average temperature substantially to that chosen for orientation and the transformation of the parison into the finished article is carried out, for example, by stretching and blowing, after it has attained a uniform cross-sectional temperature distribution corresponding to the above average temperature, preferably in a tempering mold. Such single stage operation is described in my previous U.S. Pat. No. 3,966,378 according to which the parison is injection or compression molded, cooled to a predetermined, limited degree in the injection or compression mold, transferred by means of the injection core into one or more tempering molds for equalization of its temperature distribution and then transferred into a blow mold for finishing of the final article under conditions of biaxial orientation. Such single stage operation lacks the disadvantages of excessive operating cycle, waste of heat and non-uniform temperature distribution at the time of orientation and it can provide the basis for significant improvement in the operating cycle.

A further improvement is shown in my previous U.S. Pat. No. 4,151,248 according to which the parison is provided in a formable condition at a temperature substantially above that required for orientation of said plastic on a temperature controlled first core in a temperature controlled first mold, for example, an injection mold, with the first core and first mold being held at temperatures substantially below that required for orientation of the plastic. The heat content of the parison is rapidly altered by means of heat exchange with the first core and first mold to result substantially in the parison having an average temperature suited for orientation and with an unequal distribution of temperature resulting across the walls of the parison. The resulting parison is then transferred to a closed environment, for example a tempering mold, for equalizing the temperature distribution within the walls of the parison and to attain a temperature throughout corresponding to the chosen orientation temperature of the plastic.

While this procedure represents a significant improvement, thick parisons still result in excessive time delays for cooling in the injection mold and in the tempering mold.

My copending U.S. Pat. application Ser. No. 120,266, now U.S. Pat. No. 4,352,777 responds to this problem by providing more than one tempering mold, with the tempering molds in spaced relationship to each other, for retaining and tempering parisons prior to orientation and blowing in a prolonged tempering cycle. However, delays are still attendant upon retention of the parison in the injection mold.

An additional problem in the art is to avoid undesirable opacity in the final article caused by crystalline phases. These materials are amorphous while molten and while in a glass phase and crystallize as they cool from the molten state. The crystalline material usually has a different index of light refraction than the amorphous phase. The size and degree of dispersion of the crystallites within the amorphous phase depends on the amount and rate of cooling from the molten state; if too short and too slow, the resulting composite of amorphous and crystalline phases may exhibit sufficient opacity to be undesirable in a food and beverage container. Attempts to expedite the processing cycle by unduly rapid removal of the parison from the injection mold may result in such undesirable opacity.

It is, therefore, a principal objective of the present invention is devise a method which enables an improved operating cycle.

It is a particular object of the present invention to provide such a method which does not interfere with the normal operation of the method and apparatus.

It is a still further object of the present invention to provide a method as aforesaid which is capable of achieving the aforesaid advantages without the necessity of constructing an extremely bulky and inefficient apparatus.

It is a further object of the present invention to devise a method as aforesaid which obtains a final article without undesirable opacity.

Further objects and advantages of the present invention will appear hereinbelow.

SUMMARY OF THE INVENTION

In accordance with the present invention, it has now been found that the foregoing objects and advantages may be readily obtained and an improved method provided.

The method of the present invention deals with the preparation of oriented hollow articles of moldable organic plastic material, mainly poly (ethyleneterephthalate) polymers (PET), by injection molding a parison in an injection mold, tempering the parison in a tempering mold to obtain uniform orientation conditions and orienting and expanding the tempered parison to obtain the hollow article. The improvement of the present invention comprises: rapidly cooling the parison at the injection mold until its inside temperature, i.e., the temperature near the middle between its outer skins, drops below that which corresponds to the highest rate of crystallization for the given plastic material; rapidly removing the parison from the injection mold even while the parison has an unequal temperature distribution and before the parison attains an average temperature suitable for orientation; and rapidly transferring the parison to a holding mold between the injection mold and the tempering mold for continuing to alter the heat content of the parison and thereby to attain an average temperature suitable for orientation, thus feeding the injection mold for the formation of a next parison. The holding mold is maintained at a temperature substantially lower than that of the inside parison temperature.

Accordingly, in the present invention, the parison, which is normally a thick parison, is prematurely removed from the injection mold and placed in the holding mold for continuation of the injection mold cooling function, that is, the rapid alteration of heat content as described in my previous U.S. Pat. No. 4,151,248, referred to hereinabove. The parison is preferably prematurely removed from the injection mold, if necessary by use of the procedure described in my previous U.S. Pat. No. 4,242,300, the disclosure of which is hereby incorporated herein by reference, or by other known means.

Shortening the time during which the parison resides in the injection, i.e., pressure mold, is of great economic importance because the parison dwell in that mold determines the overall output of the apparatus. In the case of crystallizable materials, however, a main purpose of such residence is to cool the parison rapidly from the melt temperature to a temperature low enough to suppress crystallization sufficiently. In accordance with the present invention an improved and rapid operating cycle is obtained and an improved procedure devised for reaching orientation temperature while substantially reducing the mold residence time of the parison without affecting the optical properties.

It can also be seen that the method of the present invention is simple and expeditious and does not involve the use of cumbersome devices. One may readily accommodate relatively thick parisons which would normally require extensive residence time in the injection mold, without inordinately retaining the parison in said mold while avoiding undesirable opacity. It is particularly useful to combine the features of the present invention with my copending U.S. Pat. application Ser. No. 120,266, now U.S. Pat. No. 4,352,777 referred to hereinabove with its plurality of tempering stations. As indicated hereinabove, in accordance with the present invention, the premature removal of the parison from the injection mold frees the injection mold for the preparaton of the next parison without prolonging the time during which the injection mold is occupied.

BRIEF DESCRIPTION OF THE DRAWING

The drawing is an elevation, partly in section, illustrating a preferred embodiment of the present invention.

DETAILED DESCRIPTION

The drawing illustrates one embodiment of the present invention. The drawing depicts a parison mold 10, having outer walls 11 which are adapted to form the outer surface of the parison, and having an end wall 12 shaped to form the end wall of the parison. The parison mold 10 is temperature controlled, such as by cooling channels 10a contained therein which are connected to appropriate heat transfer sources (not shown) wherein such temperature control may be arranged in several zones to obtain different temperatures in different regions of the parison side and end walls. The end wall 12 of the parison mold has an injection opening 13 registering with an injection nozzle 14 through which the organic plastic material is injected into the parison mold.

The formation of the parison in accordance with the embodiment illustrated in the drawing takes place after a first core 15, neck mold 20 and mold 10 are brought into engagement by suitable mechanical means, such as the motive means shown schematically. In the embodiment shown, parison mold 10 is stationary, while core 15 and neck mold 20 are axially reciprocable in the direction of the arrows into and out of engagement with mold 10. It should be understood that the present invention is not limited thereto, as reciprocable parison molds and stationary cores and/or neck molds are encompassed therein. Upon completion of injection through nozzle 14, a parison 16 is formed.

Side wall 17 and an end 18 of core 15, walls 11 and 12 of parison die 10, and the neck mold 20 constitute a die cavity in which the parison is formed. Core 15 may be temperature controlled in one or more zones, such as by internal heat exchange circuits known in the art contained therein, which are connected to an appropriate heat transfer source (not shown). Core 15 is carried by platen 19. The assembly further includes a neck mold 20 in which the neck of the parison is formed and which may if desired remain engaged with the parison after core 15 is disengaged from the parison mold, as will be described hereinbelow, which neck mold may be independently temperature controlled. The neck mold may possess threads 21 for defining a threaded opening in the final molded object. The neck mold 20 may be split and opened into two portions by suitable mechanical means such as the motive means shown schematically, to release the parison, or if the configuration of the neck permits, may be of one-piece construction and, thus, separable from the parison as a unit.

As indicated hereinabove, the parison 16 which is formed in mold 10 by injection molding is at a temperature substantially above that required for orientation. The temperature of the parison is rapidly adjusted so that an average temperature close to the one suitable for orientation is obtained without inordinate delay.

In the interest of a rapid operating cycle, it is particularly advantageous to first rapidly alter the heat content of parison 16 by heat exchange with core 15 and mold 10 to approach the heat content desired for subsequent operations, even if at the cost of an unequal distribution of temperature in said parison. This must be followed by substantially equalizing the temperature distribution across its wall thickness by causing it subsequently to reside in a suitable environment capable of influencing its temperature, such as for example a mold 22 and at times a core 30, or other environments known in the art, to avoid a layer-wise pattern of properties in the finished article corresponding to the known relationship between such properties and the deformation temperatures. This procedure is described in more detail in my U.S. Pat. No. 4,151,248 referred to hereinabove. Thus, for example, as described in said patent, one can form parison 16 by injection molding, rapidly cool said parison by heat exchange with core 15 and mold 10 which will result in a rapid cycle, but will also produce said unequal temperature distribution, followed by substantially equalizing the cross-sectional temperature distribution of said parison, for example in mold 22, all in a controlled manner, to impose thereon the temperature profile desired for orientation. Naturally, the parison remains in mold 22, at times supplemented by additional molds like mold 22 into which the parison may be sequentially transferred, until the necessary desired temperature distribution is obtained. The foregoing provides the considerable advantages of enabling the attainment of a predetermined temperature profile of the parison resulting in optimum conditions for orientation without excessive dwell time in the molds. The parison mold is freed for further use while the mold 22 is completing the conditioning of the parison, resulting in an expeditious processing cycle.

However, the operating cycle is still subject to delays attendant upon the holding time required in the injection mold, since, as long as the injection mold is being occupied by the newly injected parison, the injection mold is not free to form a further parison and cycle delays result. This is particularly pronounced with relatively thick parisons since longer injection mold delays are then involved.

Therefore, in accordance with the present invention the parison is prematurely removed from the injection mold and transferred to a holding station for completion of the cooling step normally completed in the injection mold.

However, as indicated hereinabove, one must also consider the problem of opacity. An aforesaid, the efficiency of the parison molding operation depends on the length of time during which the injection mold is occupied: the shorter, the more efficient. Even so, cooling must be continued under these conditions not only until the average temperature approaches the temperature chosen for orientation but also for at least that length of time which is necessary substantially to suppress crystallization. The parison may be removed from the mold as soon as the danger of crystallization has come within acceptable limits and, coincidentally, the average parison temperature has approached the orientation temperature.

Crystallization progresses in PET for example as follows: below approximately 100° C. and above approximately 260° C., the rate of crystallization becomes negligible, while it reaches a peak, meaning very rapid crystallization, in the temperature range of approximately 190° to 250° C. As is well known, crystalline regions cannot form below the glass transition temperature and above the melting temperature. These temperatures depend on the specific grate of PET and, more broadly, upon the nature of the crystalline thermoplastic, e.g. polypropylene, that is being considered.

As described in my U.S. Pat. No. 4,151,248 referred to above, the temperature distribution of a parison freshly removed from the pressure mold is not uniform. Thus, the parison surfaces are at a temperature approaching that of the chilled mold and core, while the inside is quite hot, approaching the temperature at which the crystallization rate is at its highest. In a short time after such removal, if left to itself, the parison skin will be heated by heat flowing from the inside. That heat-flow is relatively slow; in conseuqence, a substantial portion of the parison between the skins loses its temperature slowly and therefore transgresses the zone of rapid crystallization at a rate that favors crystallization.

In order to avoid this, the parison must be kept in a cooling mold, or at least on a cooling core, long enough for it to cool throughout below the temperature range of rapid crystallization.

A primary purpose of this invention is to define a method for reducing the residence time in the injection mold in spite of the above circumstances, in order to improve the economy of manufacture.

In accordance with the present invention, the parison is kept in the chilled environment of the injection mold until its inside temperature drops below that which corresponds to the highest rate of crystallization of the given material. The parison is removed from the chilled environment at that time and transferred into the holding station or first tempering mold fast enough, i.e., within that length of time during which little or no crystallization can occur according to the crystallization rate applicable to the inside of the preform, whereby said first tempering mold is held at a temperature that is substantially lower than that of the parison inside. For example, the injection mold may be 10° C.; in a parison with a wall thickness of approximately 3.6 mm, a temperature of approximately 200° C. will be reached in less than 8 seconds on the inside of the parison. The parison is now removed from the injection mold and transferred into the holding mold for example by use of a mechanism that takes less than 2 seconds for the transfer, during which time only negligible, if any, visible crystallization will occur, whereby the said mold may be at 50° C. to 70° C. After a dwell which equals that in the injection mold plus the time of transfer, the parison is removed from the said mold and placed into a tempering mold at the same time that the next-made parison is transferred into the holding mold. The tempering mold is held at the temperature chosen for orientation, e.g. 95° C. The parison is kept in the tempering mold long enough to equalize the temperature between its skins and its inside and then transferred into a blow mold for conversion into the bottle shape.

If the time available to cool the parison in one holding mold does not suffice, a second holding mold may continue the cooling function and the tempering mold may then follow for equalization of the parison temperature. Additional tempering molds may of course be added if necessary. How many continuing cooling and equalization steps, and therefore cooling and tempering molds are required depends on the thickness of the parison, all other variables of the molding process being equal, in order to maintain the same operating cycle of the apparatus regardless of the parison thickness.

Referring to the drawing, after the formation of parison 16 in the assembly consisting of mold 10, core 15 and neck mold 20, the parison is left therein for the shortest possible time consistent with the foregoing to cool in contact with the said elements of said assembly, each of which is temperature controlled, preferably independently of each other, in order to insure rapid and indeed premature removal from the injection mold. The temperatures of some of the said elements may be so controlled as to cool portions of the parison to a low temperature well below that suitable for orientation.

The parison is removed from the injection mold before the average temperature of the parison is substantially equal to the desired orientation temperature, naturally, with an unequal temperature distribution resulting in the parison. The parison is then transferred to the holding mold. The composite of the cooling in the injection mold and the holding mold result in the removal of approximately that amount of heat which will leave the parison with the heat content corresponding to the desired average orientation temperature, albeit with an unequal cross-sectional distribution thereof as above.

A passage 27 may be provided within core 15 communicating with an outside source of pressure fluid (not shown) and may terminate at a valve-like, closeable portion of the core. Core 15 and mold 10 are cooled, as indicated hereinabove, to provide cooling of the adjacent parison surfaces and to assure rapid removal of heat from the parison. Separation of core 15 from parison 16 without damage to it may be facilitated by air-pressure stripping of the parison from the core while leaving the neck mold engaged therewith, as described in my aforesaid U.S.Pat. No. 4,242,300. The parison may be left in mold 10 during such separation in order to prevent it from being damaged by the air pressure so introduced. Core 15 and neck mold 20 (or the neck mold alone) with parison 16 engaged thereon are then separated from mold 10, holding mold 10' is aligned with the parison by any desired motive means capable of providing relative lateral movement between the parison and mold 10' and the parison placed in the mold 10'. Mold 10' has temperature controlled cooling elements 10a' as mold 10. Also, mold 10' is preferably otherwise similar to mold 10, as having outer walls 11' and end wall 12' and conforming to the shape of parison 16.

By transfer of parison 16 into mold 10' the injection mold is freed for the formation of a further parison. After the parison has achieved an average temperature substantially corresponding to orientation temperature, naturally with an unequal temperature distribution, it is transferred to tempering mold 22 by suitable means, for example, by grippers such as shown in copending U.S. Pat. application Ser. No. 163,196 now U.S. Pat. No. 4,351,631, and an additional core shown schematically at 20' which may if desired include internal fluid passageway 27'. In the illustrative embodiment shown, gripper 20' removes parison 16 from mold 10', mold 10' moves into alignment with core 15, and parison 16 is aligned with mold 22 containing heating or cooling elements 22a, and the parison is placed in mold 22 by gripper 20'. Parison 16 is thus removed from mold 10' and mold 10' is thereby rendered capable to receive the next parison from mold 10 while parison 16 is placed in mold 22. Although a single tempering mold 22 is shown, it should be understood that a plurality of tempering molds may be employed if prolonged tempering is required, as shown in my copending U.S. Pat. application Ser. No. 120,266, the disclosure of which is incorporated herein by reference. In accordance with the preferred procedure of said copending application, a plurality of tempering molds are provided and the parisons are transferred from tempering mold to tempering mold for completion of the tempering cycle without delaying the cycle by waiting for tempering to be completed in a single tempering mold.

If desired, parison 16 may be placed in better conformance with molds 10' and 22 by the exertion of fluid pressure within the parison.

Core 30 is carried by platen 31 and may be provided with temperature control means. Since axial stretching of the parison is desired, core 30 includes a stretch and blow assembly which comprises a mandrel extension 32 which is reciprocable as indicated by the arrow to axially extend the parison 16 and at the same time admit pressure fluid inside the parison through passageway 38. An actuating means is shown which comprises a push rod 34 which engages extension 32, and which is connected to a piston 35 housed within a cylinder 36 which may, for example, be responsive to hydraulic pressure exerted by a pump, not shown. By controlling the flow of fluid into cylinder 36, the speed of piston 35 and therefore of the movable portion of core 30 may be controlled to stretch the parison at the speed best suited for the temperature of the parison. Such actuating means is merely illustrative of one manner of operation, as other actuating means known in the art can be employed herein. If a highly oriented article is not desired, the axial extension operation may be dispensed with.

After the final forming sequence, the parison is separated from mold 22 as by retaining it on core 30 by means of grippers 37, if necessary.

In the embodiment shown in the drawing, core 30 is situated in spaced relationship to core 15, and mold 22 is situated in spaced relationship to mold 10, mold 10' and a finish mold 23, to enable simultaneous performance of the plural functions. Alternative alignments, as by means of neck molds, may be used, so long as the concurrent pursuit of the injection holding cycle, tempering and final forming processes with separate parison may be accomplished. A third core 41 optionally containing fluid passageway 46 may be used to remove the fully expanded article 40 from mold 23. The ability to concurrently conduct the various operations outlined herein comprises one of the notable advantages of the invention. The simultaneous formation, holding, transfer, tempering, final expansion and finished article removal is envisioned in accordance with the present invention.

The transfer of parison 16 to mold 23, which is usually split, may be conducted by core 30 which is in engagement with mold 22 and parison 16. Accordingly, core 30 with parison 16 thereon is separated from mold 22 as, for example, by the motive means shown schematically. A core or article removal plug 41 may be provided for removing the finished article and may be positioned in lateral spaced relationship to core 30. When core 30 engages parison 16 in mold 22, the removal plug 41 engages the finished article 40 in mold 23. As shown by the arrows, the core 30 and plug 41 are axially and laterally reciprocable so that cores 30 and 41 simultaneously transfer their respective articles by a combination of axial, lateral and axial movements. If desired core 41 may be carried by platen 31 in the same manner as gripper 20'.

Parison 16 is then received in mold 23, with its temperature having been adjusted as described above. Parison 16 is usually axially extended to the bottom of mold 23 by the advancement of the movable portion of mandrel 32 by means of push rod 34 at a predetermined rate. Thus, the present invention may controllably guide the parison longitudinally while final blowing occurs and thereby produce orientation in the axial direction as well as the orientation produced by blowing. It can be seen that the temperature of the parison preparatory to stretching and blowing may be properly and conveniently controlled by the respective tempering environment and core. While stretching occurs, passageway 38 is kept open to provide pressure equalization of the inside of the parison with the atmosphere to prevent collapse of the parison due to the vacuum created inside it as its inside volume increases during stretching.

The parison is fully expanded to conform to the configuration of finishing mold 23, to form the final object 40 which, in the embodiment illustrated herein, is an open-ended container. Naturally, a wide variety of shapes may be prepared as the commercially known shapes which may be a bottle, a jar or a cup-shape. Full expansion is accomplished by supplying fluid under pressure through passageway 38 into the interior of parison 16, or at times and at various rates, into the interior of the parison while it is being extended.

In the embodiment illustrated herein, finishing mold 23 is longitudinally split into two sections labeled 42 and 43, which may reciprocate in and out of communication by an actuating means, not shown, such as for example a hydraulic cylinder. Thus, sections 42 and 43 may be parted an amount sufficient to permit the removal of article 40 by core 41.

Thus, it can be seen that the present invention improves the injection blow molding process and carries out the steps of parison production, holding, tempering, stretch orientation and circumferential orientation in a controlled sequence. The parison is injected or provided in a first station and continued holding at cooling temperature is provided in a second station to free the injection mold for the formation of a second parison. The tempering mold or molds are then used to retain the parison therein until it is ready to be inserted into the finishing mold, in engagement with a stretch-blow mandrel. The finished article may be ejected by a third or ejection core. All these are performed simultaneously in a rapid operating cycle.

The process of the present invention is simple, convenient and progressive in nature and obtains a very rapid operating cycle. The parison moves from the injection mold, to the holding mold, to tempering mold, to a finishing mold, and out.

The temperature adjustment of the parison afforded by the present invention has been found to provide an oriented product having consistently good properties, without objectionable opacity, using economical operating cycles. The parison is injected into a temperature controlled mold and left there for a very short time, transferred to a holding station and left there long enough to remove approximately the amount of heat from the parison that corresponds to the condition best suited for orientation. The result is a rapid operating cycle. The injection mold is not held up by a time-consuming holding step.

The parison is then transferred into a tempering mold or molds which impart the optimum orientation temperature distribution to the given plastic article, staying in the mold or molds long enough to equalize the temperature across the wall thickness of the parison which naturally arrives from the holding mold with a poor cross-sectional temperature profile. After tempering, the parison, now having the right temperature profile with good cross-sectional distribution, is transferred into a finishing mold in which it is stretched at a controlled rate and blown. The steps of injection plus dwell in the holding mold, of tempering and of stretch-blowing with cooling, and of article removal, occur at the same time.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. In a method for the preparation of oriented hollow articles of moldable organic plastic material in a rapid operating cycle with desirable optical properties in said hollow articles by injection molding a parison in an injection mold, tempering the parison in a tempering station to obtain uniform orientation conditions and orienting and expanding the tempered parison to obtain the hollow article, the improvement which comprises: rapidly cooling the parison in the injection mold until its inside temperature drops below that which corresponds to the highest rate of crystallization for the given plastic material; rapidly and prematurely removing the parison from the injection mold while the parison has an unequal temperature distribution and before the parison attains an average temperature suitable for orientation; and rapidly transferring the parison to a holding station between the injection mold and the tempering station within that length of time during which little or no visable crystallization can occur according to the crystallization rate applicable to the inside of the parison for continuation of the injection mold cooling function and for continuing to alter the heat content of the parison to attain an average temperature suitable for orientation with an unequal cross-sectional temperature distribution across the walls of the parison, wherein said average temperature suitable for orientation is attained in the parison prior to the tempering of the parison in a tempering station thus freeing the injection mold for the formation of a next parison, and thereby obtaining a rapid operating cycle while avoiding undesirable opacity due to crystalline regions in said hollow articles.

2. In a method according to claim 1 wherein said plastic is poly (ethyleneterephthalate).

3. A method according to claim 1 wherein said tempering station is a tempering mold.

4. In a method according to claim 3 wherein the holding mold is maintained at a temperature substantially lower than that of the inside parison temperature.

5. In a method according to claim 3 wherein the tempering mold is maintained at the orientation temperature.

6. A method according to claim 1 wherein said holding station is a holding mold.

7. In a method according to claim 6 wherein the holding mold is maintained at a temperature of from 50°–70° C.

* * * * *